United States Patent Office 3,801,547
Patented Apr. 2, 1974

3,801,547
SOLID PHASE POLYCONDENSATION PROCESS
Guenther Kurt Hoeschele, Wilmington, Del., assignor to E. I. du Pont de Nemours and Company, Wilmington, Del.
No Drawing. Filed Mar. 20, 1972, Ser. No. 236,444
Int. Cl. C08g 17/003
U.S. Cl. 260—75 M          11 Claims

ABSTRACT OF THE DISCLOSURE

A process for preparing segmented thermoplastic copolyesters of sufficiently high molecular weight so that the inherent viscosity of the copolyester is at least about 1.2 measured in m-cresol at 30° C., wherein solid particles of the partially polymerized copolyester having an inherent viscosity of at least about 0.8, preferably in the form of granules of about 5 to 20 mesh, are heated to a temperature of about 140–220° C. The heating takes place in an inert gas stream or in vacuum, for a period of 1 to 72 hours.

BACKGROUND OF THE INVENTION

This invention relates to thermoplastic copolyesters and more particularly to copolyesters of a high molecular weight having an inherent viscosity of at least about 1.2, measured in m-cresol at 30° C., which are prepared by solid phase polycondensation of granular particles of partially polymerized copolyester.

Linear thermoplastic copolyesters have been suggested heretofore for various purposes, particularly for the production of films and fibers. Recently, copolyesters have been discovered which are suitable for a large variety of applications since they possess superior tear strength, tensile strength, flex life and abrasion resistance. Copolyesters of this type are especially suited for use in molded tires and treads for snowmobiles. In the peparation of such copolyesters heretofore expensive continuous melt condensation equipment of limited capacity has been required to achieve the high molecular weights which are necessary if the copolyester is to have the desired properties previously mentioned. While continuous melt condensation is an efficient process for manufacturing polyesters of moderate molecular weight, it becomes more difficult to operate, requires more sophisticated equipment and becomes less productive as a means of producing polyesters of higher molecular weights. Eventually a point is reached where the difficulties experienced in handling high melt viscosity polymers prevent further practical increases in molecular weight. For certain copolyesters, polymerization by conventional melt condensation has even failed to yield polymers having acceptable high molecular weights.

SUMMARY OF THE INVENTION

According to this invention there is provided an inexpensive, efficient method for producing thermoplastic copolyester which has inherent viscosity of at least about 1.2. The preparation of such a high viscosity copolyester is accomplished by solid phase polycondensation which is initiated at a time when the inherent viscosity of the polyester is at least 0.8 dl./g. as measured in m-cresol at 30° at a concentration of 0.1 g./dl. Polyester granules are subjected to a temperature of about 140–220° C. while in an inert gas stream or in vacuum, for a period of at least 1 hour, 1 hour to 72 hours. The starting polyester granules having an inherent viscosity of at least about 0.8 are formed by solidifying and dividing a copolyester formed by melt condensation technique is quite inexpensive relative to the previously mentioned conventional condensation. Such a polycondensation technique is quite inexpensive relative to the previously mentioned conventional melt condensation technique and unexpectedly, may be utilized with large size particles of about 5 to 20 mesh in a preferred embodiment of this invention.

The thermoplastic copolyester which is subjected to the solid phase polycondensation of the instant invention consists essentially of a multiplicity of recurring intralinear long chain and short chain ester units connected head-to-tail through ester linkages, said long chain ester units being represented by the following structure:

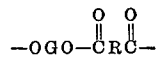

(a)

and said short chain ester units being represented by the following structure:

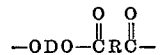

(b)

wherein:

G is a divalent radical remaining after removal of terminal hydroxyl groups from poly(alkylene oxide) glycols having a carbon-to-oxygen ratio of about 2.0–4.3, a molecular weight above about 400 to 4,000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250;

with the provisos that the short chain ester units constitute about 15–95% by weight of the copolyester, at least about 70% of the R groups must be 1,4-phenylene radicals, at least about 70% of the D groups must be 1,4-butylene radicals, and the sum of the percentages of the R groups which are not 1,4-phenylene radicals and of the D groups which are not 1,4-butylene radicals cannot exceed about 30%.

The segmented thermoplastic copolyester described above is prepared by reacting at elevated temperature and by conventional melt condensation means: a dicarboxylic acid having a weight less than about 300 or its corresponding ester equivalent, which is represented by the formula

wherein R is a divalent radical and R′ is independently selected from the group consisting of hydrogen and $C_1$–$C_{10}$ alkyl; a poly(alkylene oxide) glycol having a molecular weight of about 400–4000 and a carbon to oxygen ratio of about 2.0–4.3 which would be represented by the formula HO—G—OH wherein G is a divalent radical; and a diol having a molecular weight less than about 250 which would be represented by the formula HO—D—OH wherein D is a divalent radical.

After the thermoplastic copolyester has been partially polymerized by melt condensation and has an inherent viscosity of at least about 0.8 and preferably at least about 1.0 it is solidified and put in divided form after which the polyester is heated, below its polymer stick temperature, to a temperature of about 140–220° C. in an inert gas stream e.g. nitrogen, carbon dioxide, hydrogen or methane or in vacuo at a pressure of less than about 1 mm. Hg for a period of about 1 to 72 hours.

The copolyester granules introduced into the solid phase polycondensation conveniently may have a particle size of about 5 to 20 mesh, preferably 6 to 12 mesh, by U.S. Bureau of Standards, Standard Screen Series. Typically, about 90% or more of the particles will pass a 5 to 20 mesh screen. Realistically, the particles should not be larger than about 5 mesh. Particles of this size are not ordinarily polymerized in the solid phase because of low rate of reaction and non-uniform polymerization throughout the granules. In the instant case however, with the copolyesters, no problem is encountered when these relatively large granules are subjected to the above described treatment.

DETAILED DESCRIPTION

The term "long chain ester untis" as applied to units in a polymer chain refers to the reaction product of a long chain glycol with a dicarboxylic acid. Such "long chain ester units" which are a repeating unit in the copolyetheresters of this invention, correspond to Formula a above. The long chain glycols are polymeric glycols having terminal (or as nearly terminal as possible) hydroxyl groups and a molecular weight from about 400–4000. The long chain glycols used to prepare the copolyetheresters of this invention are poly(alkylene oxide) glycols having a carbon-to-oxygen ratio of about 2.0–4.3. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3). The carbon to oxygen ratio of about 2.0–4.3 is meant to include lower molecular weight glycols in which the carbon to oxygen ratio is 1.8 since the 2.0 to 4.3 ratio does not take into account the elements of water, which are present in the glycol in addition to the alkylene oxide units, but are split out and are not part of the polymer.

The term "short chain ester units" as applied to units in a polymer chain refers to low molecular weight polymer chain units having molecular weights less than about 550. They are made by reacting a low molecular weight diol (below about 250) with a dicarboxylic acid to form ester units represented by Formula b above.

Included among the low molecular weight diols (other than 1,4-butanediol) which react to form short chain ester units are acyclic and alicyclic dihydroxy compounds. Preferred are diols with 2–15 carbon atoms such as ethylene, propylene, pentamethylene, 2,2-dimethyltrimethylene, hexamethylene, and decamethylene glycol, dihydroxy cyclohexane, cyclohexane dimethanol, etc. Especially preferred are aliphatic diols containing 2–8 carbon atoms. Equivalent ester-forming derivatives of diols are also useful (e.g. ethylene oxide or ethylene carbonate can be used in place of ethylene glycol). The term "low molecular weight diols" as used herein should be construed to include such equivalent ester-forming derivatives as diacetates; provided, however, that the molecular weight requirement pertains to the diol only and not to its derivatives.

Dicarboxylic acids (other than terephthalic acid) which are reacted with the foregoing long chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxylic groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxylic groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyl-malonic acid, allyl-malonic acid, 4-cyclohexene-1,2-dicarboxylic acid, 2-ethylsuberic acid, 2,2,3,3 - tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene-bis(cyclohexane carboxylic acid), 3,4-furan dicarboxylic acid, and 1,1-cyclobutane dicarboxylic acid. Preferred aliphatic acids are cyclohexane dicarboxylic acids and adipic acid.

Representative aromatic dicarboxylic acids which can be used include terephthalic, phthalic and isophthalic acids, bibenzoic acid, substituted dicarboxy compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are a preferred class for preparing the copolyester polymers of this invention. Among the aromatic acids, those with 8–16 carbon atoms are preferred, particularly the phenylene dicarboxylic acids, i.e., terephthalic, phthalic and isophthalic acids. As mentioned previously the esters of the phenylene dicarboxylic acids and in particular their dimethyl esters are included within the scope of the term dicarboxylic acid.

It is essential that at least about 70 mole percent of the dicarboxylic acid incorporated into the polymer be terephthalic acid and at least about 70 mole percent of the low molecular weight diol incorporated into the polymer be 1,4-butanediol. This means that 70% of the total R groups in Formula a plus Formula b above are 1,4-phenylene radicals. Thus, fewer than 70% of the R groups in either of Formula a or Formula b can be 1,4-phenylene radicals provided that at least 70% of the total R radicals in both formulas are 1,4-phenylene radicals. At least about 70% of the D groups in Formula b above are 1,4-butylene radicals (derived from 1,4-butanediol). A further requirement of the polymers of this invention is that the sum of the percentages of the R groups which are not 1,4-phenylene radicals and of the D groups which are not 1,4-butylene radicals cannot exceed about 30%. For example, if 30% of the low molecular weight diol molecules used are other than 1,4-butanediol, then all of the dicarboxylic acid used must be terephthalic acid, or if 10% of the low molecular weight diol molecules used are other than 1,4-butanediol, then at least about 80% of the dicarboxylic acid used must be terephthalic acid. Because of their rapid rate of crystallization these copolyesters are readily formed into solid particles suitable for use in the instant process and are particularly useful as finished polymers for injection molding.

The short chain ester units will constitute about 15–95 weight percent of the copolyester. The remainder of the copolyester will be the long segments and thus the long segment will comprise about 5–85 weight percent of the copolyetherester.

Minor amounts, e.g. 0.3–1.2 equivalents per 100 moles of dicarboxylic acid, of polyfunctional hydroxyl compounds, polycarboxylic acids or hydroxy acids may be included if desired.

Most preferred copolyesters are those prepared from dimethyl terephthalate, 1,4-butanediol, and poly(tetramethylene oxide) glycol having a molecular weight of about 600–2000 or poly (ethylene oxide) glycol having a molecular weight of about 600–1500. Optionally, up to about 30 mole percent and preferably 5–25 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole percent and preferably 10–25 mole percent of the dimethyl terephthalate can be replaced with dimethyl isophthalate or butanediol can be replaced with neopentyl glycol until up to about 30 percent and preferably 10–25 percent of the short chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixtures. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

The partially polymerized polymers having an inherent viscosity of at least 0.8 can be made conveniently by a conventional ester interchange reaction.

A preferred procedure involves heating the dimethyl ester of terephthalic acid with a long chain glycol and a molar excess of 1,4-butanediol in the presence of a catalyst at about 150–260° C. and a pressure of 0.5 to 5 atmospheres, preferably ambient pressure, while distilling off methanol formed by the ester interchange. Depending on temperature, catalyst, glycol excess, and equipment, this reaction can be completed within a few minutes e.g. 2 minutes to a few hours e.g. 2 hours.

Concerning the molar ratio of reactants, at least about 1.1 mole of diol should be present for each mole of acid, preferably at least about 1.25 mole of diol for each mol of acid. The long chain glycol should be present in the amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids or anhydrides, for example, with diols or by other processes such as reaction of the acids with cyclic ethers or carbonates. Obviously, the prepolymer might also be prepared by running these processes in the presence of the long chain glycol.

The resulting prepolymer is then carried to higher molecular weight by distillation of the excess of short chain diol from the melt. This process is known as "melt polycondensation."

Additional ester interchange occurs during this polycondensation which serves to increase the molecular weight and to randomize the arrangement of the copolyester units. Best results are usually obtained if this final distillation or polycondensation is run at less than about 5 mm. Hg pressure and about 200–270° C. for less than two hours e.g. 0.5 to 1.5 hours.

Traditionally, an ester interchange which is run as a melt is utilized at this point to complete the condensation. Melt condensation is an efficient process for preparing copolyesters of moderately high molecular weight e.g. polymers having inherent viscosities in the range of about 0.8 to 1.0.

According to the instant invention a polycondensation step in the solid phase is utilized to complete the polymerization of the copolyester or to carry it to molecular weights higher than can be practically achieved by melt condensation. At the end of the partial melt polycondensation as it is described above the copolyester typically has an inherent viscosity of at least 0.8. In order to achieve higher inherent viscosity the copolyester particles are subjected to additional processing.

The copolyester particles have a particle size not greater than about 5 mesh, preferably 5 to 20 mesh and most preferably 6 to 12 mesh as determined by the U.S. Bureau of Standards, Standard Screen Series. Much smaller particles, e.g. 100 mesh, can be used but are not preferred. Typically, when particles of about 5 to 20 mesh are subjected to solid phase polymerization low rates of polycondensation are encountered and non-uniform polymerization occurs throughout the particles with higher polymers forming on the outside. No such difficulties are encountered in the preparation of the copolyesters prepared by the present process with particles which will pass a 5 mesh screen.

The particles required for the solid phase polycondensation can be formed by any conventional techniques. The partially condensed material from the melt can be cooled by casting on a cold wheel and shredding the resulting sheet. A preferred technique involves forming a strand of the melt, quenching it with cold water and cutting the strand into pellets of about 0.62 in. to 0.125 in. in diameter. The larger pellets are especially preferred and after solid phase polycondensation only require packaging before sale. The use of these large particles avoids many of the complications previously encountered with solid phase polycondensate.

The particles are subjected to the temperature of about 140–220° C., preferably about 20° C. below the polymer stick temperature for a period of about 1 to 72 hours, usuually for about 4 to 48 hours. The temperature range selected is such that lower temperatures would be impractical because of very low rates of reaction. The upper temperature limit is set by the softening point or polymer stick temperature.

The solid phase polycondensation must take place in an inert gas stream or in a vacuum. Preferred inert gas streams are nitrogen, carbon dioxide and carbon monoxide. When an inert gas stream is used, the pressure may range from reduced pressures as low as about 1 mm. Hg up to superatmospheric pressure, but operation at about 1 atmosphere is preferred. If vacuum is to be utilized alone a pressure of less than about 5 mm. Hg must be maintained. The use of an inert gas stream or vacuum is essential to remove polymerization by-products, normally the low molecular weight diol, from the space surrounding the copolyester particles as the polymerization is reversible in the presence of the by-products. The use of an inert gas stream at about atmospheric pressure is preferred.

The solid phase polycondensation can be carried out in batch and continuous equipment such as fixed bed reactors, rotating reactors, moving bed reactors and fluid-bed reactors.

The inherent viscosity of the partially condensed polyester which is subjected to solid phase polycondensation is a critical feature of the present invention. Partially condensed polyesters having inherent viscosities below about 0.8 can be subjected to the steps of solid phase polycondensation and their inherent viscosity can be increased; however, the products are deficient in many important physical properties such as tensile strength compared to the properties obtainable by full melt condensation. When the starting partially polymerized copolyester has an inherent viscosity of at least about 0.8 dl./g. measured in m-cresol at 30° C. at a concentration of 0.1 g./dl. and preferably at least about 1.0, the properties obtained by solid phase polycondensation match or exceed those obtainable by melt condensation.

The solid phase polycondensation reaction is continued until the desired inherent viscosity of at least about 1.2 is reached. The course of the reaction may be followed by removing samples periodically and determining their inherent viscosity. If a correlation has ben developed between inherent viscosity and melt index for the copolyester being prepared, the melt index of periodic samples can be used to follow the reaction.

The present process may be used as an alternate process to prepare copolyesters having inherent viscosities which can also be achieved in polymers prepared exclusively by melt condensation. For instance, copolyesters based on poly(tetramethylene oxide) glycol having inherent viscosities of about 1.2 to 1.6 can be prepared exclusively by melt condensation or alternatively by the present process in which melt polymerization would be carried to an inherent viscosity of at least about 0.8 and preferably about 1.0 and solid phase polymerization would be used to increase and inherent viscosity up to the range of about 1.2 to 1.6. The products produced by these two routes are equivalent in most respects but the polymers prepared by the present invention have lower carboxyl end group contents which results in improved hydrolytic stability and increased chemical resistance.

The present process is further useful in that it can be used to prepare copolyesters having inherent viscosities which cannot be achieved by means of melt condensation. In the case of copolyetheresters based on poly(tetramethylene oxide) glycol, an inherent viscosity of about 1.6 is the maximum viscosity which can be achieved regularly in conventional commercial facilities. By continuing the polymerization in the solid phase process, polymers having an inherent viscosity of at least about 0.8 up to about 1.6 can be carried to molecular weights corresponding to inherent viscosities of 3.0 or even greater. This aspect of the present process is particularly important in preparing copolyesters based on poly(1,2-propylene oxide) glycol, because the highest inherent viscosity available by conventional melt condensation approach values of only about 1.2. By using the present process, polymers having inherent viscosities of 1.3 and higher can be readily produced from poly(1,2-propylene oxides) glycol. The physical properties such as tensile strength and flex life of the polymers having inherent viscosity of 1.3 and greater are significantly better than those exhibited by polymers made by conventional melt condensation. These improvements in properties are of such magnitude that the product of the present process can be used successfully in certain applications, such as molded vehicle tires, for which the product produced exclusively by melt condensation would be unacceptable.

The properties of these copolyesters can also be modified by incorporation of various conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft polyesters of this invention.

Additionally, if desired stabilizers may be added to the copolyesters.

All parts, proportions and percentages disclosed herein are by weight unless otherwise indicated.

The following examples illustrate the invention:

EXAMPLES

The following ASTM methods are employed in determining the properties of the polymers prepared in the examples which follow:

| | |
|---|---|
| Modulus at 100% elongation | D412 |
| Modulus at 300% elongation | D412 |
| Modulus at 500% elongation | D412 |
| Tensile at break | D412 |
| Elongation at break | D412 |
| Hardness, Shore D | D1484 |
| Trouser tear | [1] D470 |
| Melt index | [2] D1238 |

[1] Modified by use of 1.5″ x 3″ sample with 1.5″ cut on the long axis of the sample. This configuration prevents "necking down" at the point of tearing.
[2] 2160 g. load.

The inherent viscosity is determined at a concentration of 0.1 g./dl. in m-cresol at 30° C. and is expressed in dl./g.

The carboxyl group content can be determined by dissolving the copolyester in cresol, adding water and chloroform, and titrating the solution with standardized ethanolic potassium hydroxide. The end point is determined by potentiometry.

The following catalysts are used in preparing the compositions of the examples:

Catalyst A

To 425 parts of anhydrous 1,4-butanediol in a round bottom flask is added 23.32 parts of tetrabutyl titanate. The mixture is agitated at 50° C. for 2–3 hours until the small amount of solids originally present disappear.

Catalyst B

An agitated flask equipped for reflux is charged with 400 ml. of methyl alcohol, 22.3 gm. of anhydrous magnesium acetate, 88.8 ml. of tetrabutyl titanate and 300 ml. of 1,4-butanediol. Agitation is started and the mixture is refluxed at 65° C. for about one-hour until complete solution of solids occurs.

EXAMPLE 1

(A) The following materials are placed in a flask fitted for distillation:

| | Parts |
|---|---|
| Poly(tetramethylene oxide) glycol, number average molecular weight 975 | 428 |
| Dimethyl terephthalate | 740 |
| 1,4-butanediol | 430 |
| 4,4′-bis(α,α-dimethylbenzyl)diphenylamine | 6.15 |
| Catalyst A | 24 |

A stainless steel stirrer with a paddle cut to conform with the internal radius of the flask is positioned about ⅛″ from the bottom of the flask and agitation is started.

The flask is placed in an oil bath at 160° C., agitated for five minutes and then the catalyst is added. Methanol distills from the reaction mixture as the temperature is slowly raised to 250° C. over a period of one hour. When the temperature reaches 250° C., the pressure is gradually reduced to 0.35 mm. Hg within 20 minutes. The polymerization mass is agitated at 250° C./0.1 mm. Hg for 35 minutes. Then the polycondensation polymerization is discontinued and the resulting viscous molten product is scraped from the flask in a nitrogen (water and oxygen free) atmosphere and allowed to cool. The resulting polymer has an inherent viscosity of 1.02 dl./g. and a melt index of 48.5 g./10 min. measured at 220° C.

After shredding and drying at 120° C./1 mm. Hg for 6 hours the polymer is extruded at 230° C. into a strand having a diameter of 0.062 inch (12 mesh) which is cut into 0.18″ lengths after quenching in water.

An agitated flask as described above is charged with 900 parts of the above pelletized polymer and heated in an oil bath at 180° C. under reduced pressure (2 mm. Hg) while a slow stream of nitrogen is passed over the polymer. After 13 hours of polymerization in the solid state the charge is allowed to cool to room temperature under nitrogen. The resulting polymer has an inherent viscosity of 1.37 dl./g., a melt index of 6.26 measured at 220° C. and a carboxyl content of 8.4 milliequivalents/kg.

The solid phase polymerization can also be carried out in a fixed bed reactor under atmospheric pressure by passing hot nitrogen gas through the granular polymer at 180° C.

Substantially the same results are obtained when the cut strand diameter is decreased to 0.031 inch (20 mesh) or increased to 0.125 inch (6 mesh). This indicates that the rate of polycondensation under these conditions is substantially independent of the particle size within this range.

(B) For control purposes, the preparation of Copolyester A is substantially repeated except that the melt condensation polymerization is conducted for 25 minutes instead of 35 minutes. The resulting polymer has an inherent viscosity of 0.70 dl./g. and a melt index of 162 measured at 220° C. After converting the polymer into cut strand having a diameter of 0.062 inch, the polymer is polymerized in the solid phase at 180° C./2 mm. Hg for 10 hours as described above. The resulting polymer has an inherent viscosity of 1.35, a melt index of 6.54 g./10 min. at 220° C. and a carboxyl content of 8.5 milliequivalents/kg.

(C) For control purposes, the preparation of Copolyester A is substantially repeated except that the polycondensation is solely carried out by melt condensation polymerization for 50 minutes. The polymer prepared in this manner has inherent viscosity of 1.57 dl./g., a melt index of 4.56 g./10 min. and a carboxyl content of 23.2 milliequivalents/kg.

Seventy-five mil slabs are compression molded at 240° C. from all three polymers compositions. The stress-strain properties tabulated below are determined at a crosshead speed of 2 inches/min. on rings which are died out from slabs.

|  | Polymer 1A | Control polymer 1B | Control polymer 1C |
|---|---|---|---|
| Room temperature properties: |  |  |  |
| Tensile strenfth, p.s.i | 6,125 | 3,245 | 5,910 |
| Elongation at break, percent | 735 | 400 | 690 |
| 100% modulus, p.s.i | 2,835 | 2,700 | 2,610 |
| 300% modulus, p.s.i | 3,200 | 3,020 | 2,950 |
| 500% modulus, p.s.i | 4,100 | | 3,920 |
| Hardness, Shore D | 56 | 57 | 56 |
| 150° C. properties: |  |  |  |
| Tensile strength, p.s.i | 2,625 | 765 | 2,800 |
| Elongation at break, percent | 740 | 75 | 760 |
| 100% modulus, p.s.i | 743 | | 660 |
| 300% modulus, p.s.i | 1,100 | | 980 |
| 500% modulus, p.s.i | 1,760 | | 1,680 |

It is evident that the physical properties of the polymer composition of this Example 1(A) are essentially equivalent to those obtained from Control Polymer 1C which is entirely prepared by melt condensation polymerization. On the other, Control Polymer 1B—which is prepared by the same combination of a melt and solid phase polycondensation process as Polymer 1A, except that a lower molecular weight polymer is initially prepared in the melt polycondensation step—exhibits greatly inferior tensile strength at room temperature and 150° C.

EXAMPLE 2

The melt polymerization procedure described in Example 1 is repeated except that the following starting materials are used:

|  | Parts |
|---|---|
| Poly(1,2-propylene oxide) glycol, number average molecular weight 1000 | 380 |
| Dimethyl terephthalate | 640 |
| 1,4-butanediol | 390 |
| Sym-di-β-naphthylphenylene diamine | 3.25 |
| Catalyst B | 7.5 |

The polycondensation is carried out at 250° C./0.1 mm. Hg for 80 minutes. The resulting polmer is characterized as follows:

| Inherent viscosity, dl./g. | 1.22 |
|---|---|
| Melt index at 220° C., g./10 min. | 5.10 |
| Carboxyl content, milliequivalents/kg. | 20.2 |

The above inherent viscosity and melt index data represent maximum values obtainable by melt condensation polymerization regardless of the length of polycondensation cycle.

After shredding the particle size of the polymer is as follows:

|  | Percent |
|---|---|
| >9 mesh size | 72 |
| >20 mesh size | 95 |

Forty parts of shredded polymers are polymerized in the solid phase at 180° C./0.6 mm. Hg as described in Example 1 except that a rotated flask was used instead of the agitated flask. The rate of polymerization was followed by analyzing samples after 6 and 22 hours, respectively, the results are tabulated below:

| Length of solid phase polymerization cycle, hrs. | Inherent viscosity, dl./g. | Melt index at 220° C. g./10 min. | Carboxyl content milliequivalent/kg. |
|---|---|---|---|
| 0 | 1.22 | 5.10 | 20.1 |
| 6 | 1.41 | 1.74 | 15.8 |
| 22 | 1.69 | 0.27 | 14.9 |

It is evident that by solid phase polymerization, the degree of polymerization can be very significantly increased beyond the level obtainable by melt condensation polymerization.

Eighty mil slabs are prepared for physical testing by compression molding at 240° C. from the polymer of this example prepared by solid phase polymerization and the starting material which represents the maximum molecular weight polymer obtainable by melt condensation polymerization. The physical properties of the two different polymers are tabulated below. The stress-strain properties are determined on dumbbells at a crosshead speed of 20 inches/min.

|  | Polymer of Ex. 2 prepared by solid phase polymerization | Control polymer prepared by melt condensation polymerization |
|---|---|---|
| Inherent viscosity, dl./g | 1.69 | 1.22 |
| Tensile strength, p.s.i | 6,100 | 3,750 |
| Elongation at break, percent | 690 | 550 |
| 100% modulus, p.s.i | 2,100 | 2,060 |
| 300% modulus, p.s.i | 2,610 | 2,500 |
| 500% modulus, p.s.i | 3,580 | 3,500 |
| Trouser tear, p.l.i | 320 | 220 |

The results show that the polymer of Example 2 is markedly superior in tensile and tear strength compared to the control polymer because of its higher degree of polymerization. Other physical properties such as flex life, creep resistance, and hydrolytic stability are also substantially improved. The last mentioned property does not only benefit from the higher molecular weight of the polymer, but also from its lower carboxyl content.

What is claimed is:

1. A process for preparing a segmented thermoplastic copolyester having an inherent viscosity of at least 1.2, said copolyester consisting essentially of a multiplicity of recurring long chain ester units and short chain ester units joined head-to-tail through ester linkages, said long chain ester units being represented by the formula (I) 

and said short chain units being represented by the formula (II) 

wherein:
(a) said short chain ester units amount to about 15–85% by weight of said copolyester,
(b) at least about 70% of the R groups in Formulae I and II are 1,4-phenylene radicals and at least about 70% of the D groups in Formula II are 1,4-butylene radicals, and
(c) the sum of the percentages of R groups in Formulae I and II which are not 1,4-phenylene radicals and of D groups in Formula II which are not 1,4-butylene radicals does not exceed about 30, which comprises (1) partially polymerizing by melt condensation a dicarboxylic acid having a weight less than about 300; said acid being represented by the formula

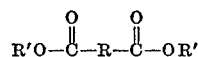

wherein R is a divalent radical and R' is independently selected from the group consisting of hydrogen and $C_1$–$C_{10}$ alkyl; a poly(alkylene oxide) glycol having a molecular weight of about 400–4000 and a carbon to oxygen ratio of about 2.0–4.3 said glycol being represented by the formula

wherein G is a divalent radical, and a diol having a molecular weight less than about 250 and represented by the formula

wherein D is a divalent radical, until said copolyester has an inherent viscosity of at least about 0.8 (2) converting the melt into divided solid particles and (3) polymerizing said particles by heating at a temperature of about 140–220° C. in an inert gas stream or in a vacuum until said particles have an inherent viscosity of at least about 1.2.

2. The process of claim 1 wherein substantially all of said particles will pass a 5 mesh screen.

3. The process of claim 1 wherein said particles are polymerized by heating at a temperature of about 140–220° C. for a period of about 1 to 72 hours in an inert gas stream until said particles have an inherent viscosity of at least about 1.2.

4. The process of claim 1 wherein said particles are polymerized by maintaining a vacuum of less than about 5 mm. Hg and a temperature of about 140–220° C.

5. The process of claim 1 wherein said copolyester has an inherent viscosity of at least about 1.0 prior to converting and polymerizing.

6. The process of claim 5 wherein said particles will pass a 6 to 12 mesh screen.

7. The process of claim 1 wherein said glycol comprises poly(1,2-propylene oxide) glycol.

8. The process of claim 1 wherein said dicarboxylic acid is selected from the group consisting of phthalic acid, terephthalic acid, isophthalic acid, their dimethyl esters and mixtures thereof.

9. The process of claim 1 wherein the poly(alkylene oxide) glycol comprises poly(tetramethylene oxide) glycol having a molecular weight of about 600–2000.

10. The process of claim 1 wherein said dicarboxylic acid is a mixture of dimethyl terephthalate and a maximum of 30 mole percent of dimethyl isophthalate, dimethyl phthalate or mixtures thereof.

11. The process of claim 1 wherein said glycol is poly(tetramethylene oxide) glycol having a molecular weight of about 600–2000, said dicarboxylic acid is dimethyl terephthalate and said diol is 1,4-butanediol.

References Cited

UNITED STATES PATENTS

| | | | |
|---|---|---|---|
| 2,901,466 | 8/1959 | Kibler et al. | 260—75 |
| 3,075,952 | 1/1963 | Coover et al. | 260—75 |
| 3,463,760 | 8/1969 | Barkey | 260—75 |
| 3,117,950 | 1/1964 | Kibler et al. | |
| 3,023,192 | 2/1962 | Shivers. | |
| 3,651,014 | 3/1972 | Witsiepe. | |
| 3,663,653 | 5/1972 | Frolhich et al. | |

FOREIGN PATENTS 1,066,162   4/1967   Great Britain.

OTHER REFERENCES

Kirk-Othmer: Encycl. Chem. Technol. 16, 177 (1968).

MELVIN GOLDSTEIN, Primary Examiner

U.S. Cl. X.R.

260—47 C, 75 S